April 26, 1932.  J. W. HUGHES  1,855,450
CHUCK
Filed Oct. 22, 1927   2 Sheets-Sheet 1
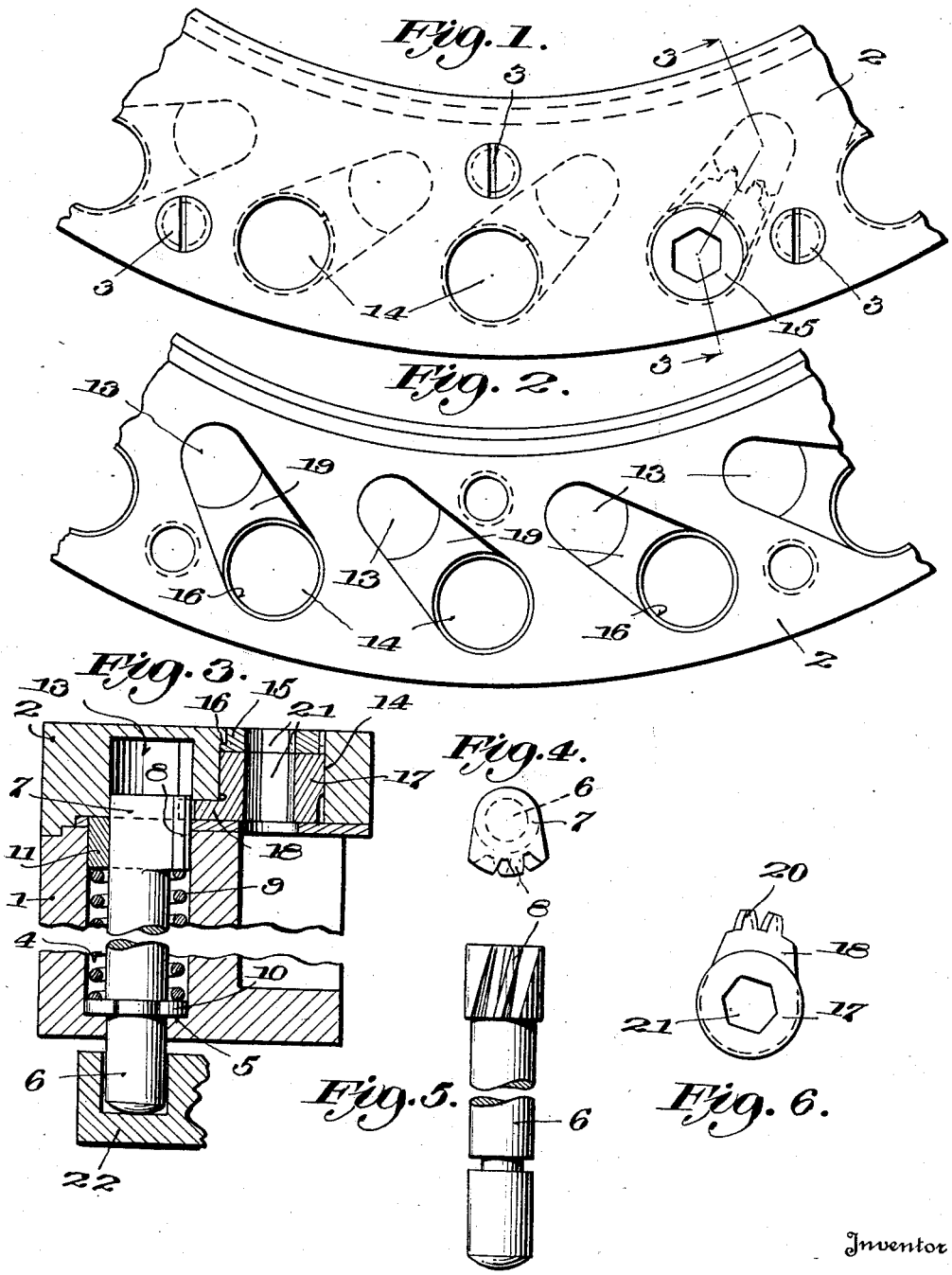

April 26, 1932.    J. W. HUGHES    1,855,450
CHUCK
Filed Oct. 22, 1927    2 Sheets-Sheet 2

Inventor:
James W. Hughes,
By John P. Tarbox
Attorney

Patented Apr. 26, 1932

1,855,450

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

CHUCK

Application filed October 22, 1927. Serial No. 227,881.

This invention relates to chucks and has particular reference to an automatic chuck for detachably retaining articles in position on a support.

The present invention is intended primarily for use in connection with the machine disclosed in the application of James W. Hughes filed November 18, 1926, Serial No. 149,077, and entitled Automatic machine, although the present invention is not limited to such use and is applicable to numerous other types of machines and uses as will become apparent hereinafter.

The primary object of the present invention is to provide an automatic chuck which shall securely retain the article in position on a support while various tools operate thereon and which shall readily release the article at a predetermined time so that it may be easily and quickly discharged therefrom.

Another object is to provide a chuck of this character which shall consist of relatively few parts that are simple in construction and inexpensive to manufacture, and which may be easily and quickly assembled.

A further object is to provide a chuck which shall be durable and positive in operation, but which shall in no way mar or injure the article held therein.

With these and other objects in view, the invention may be stated to consist in the various novel features of construction and arrangement or combination, all of which will be fully described hereinafter and pointed out in the appended claims.

Figure 7:
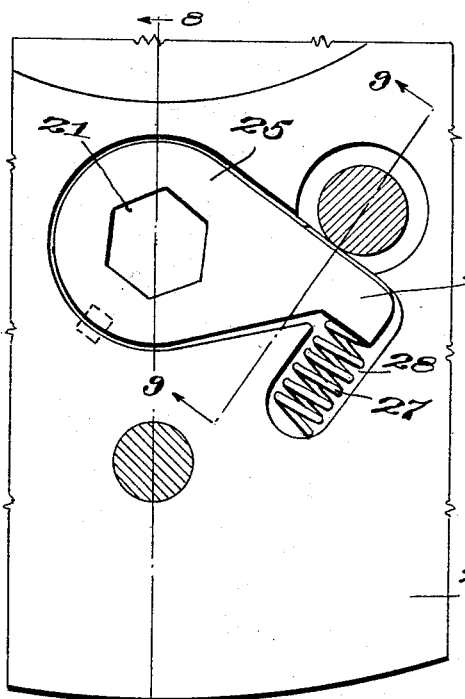
Figure 8:
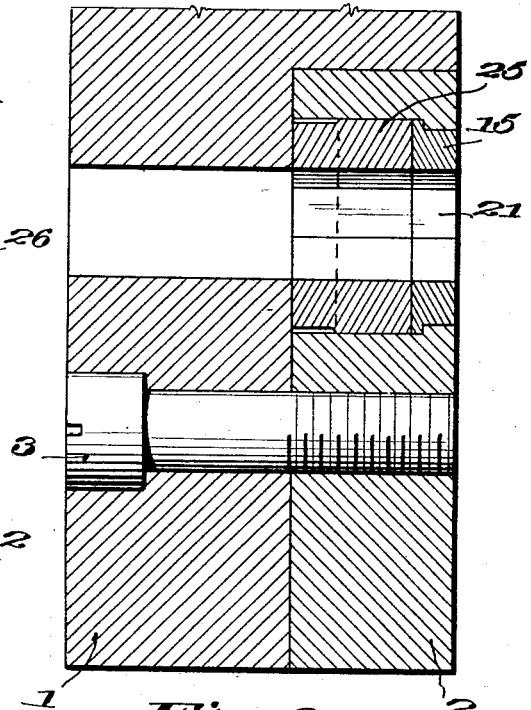
Figure 9:
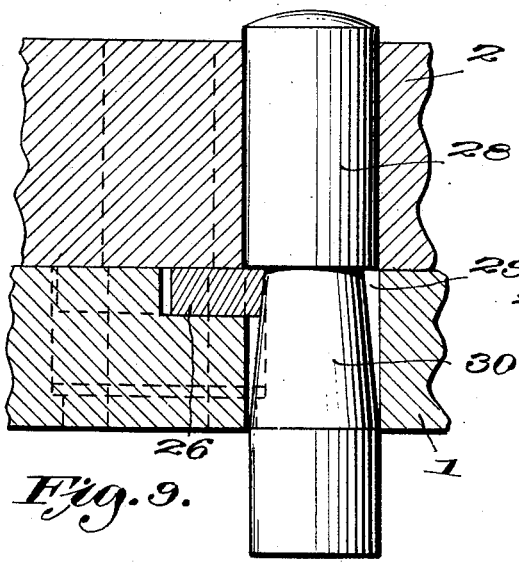
Figure 10:
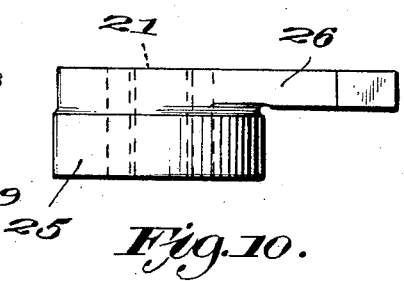

In the drawings accompanying and forming part of this application, Fig. 1 is a fragmentary plan view of a support showing a chuck constructed in accordance with my invention incorporated therein; Fig. 2 is a bottom plan view of the support with the chuck elements removed therefrom; Fig. 3 is a vertical sectional view taken on the line 3—3 of Fig. 1; Fig. 4 is a top plan view of the actuating rod; Fig. 5 is a side elevation thereof; Fig. 6 is a plan view of the movable chuck member; Fig. 7 is a fragmentary sectional view of a support showing a modified form of chuck; Figs. 8 and 9 are sectional views taken respectively on the lines 8—8 and 9—9 respectively of Fig. 7; and Fig. 10 is a side elevation of one of the chuck elements.

In the present instance, I have illustrated my invention as applied to an annular work support such as is used in the automatic machine disclosed in the copending application above referred to, although it will be understood that any suitable support might be used equally well. The support shown comprises a base ring 1 upon which is mounted a second ring 2 which is secured thereto by screws 3 or other suitable fastening means. These rings carry a plurality of clutch elements each identical in construction so that a detailed description of one will be sufficient for all.

Base ring 1 is formed with a plurality of bores 4 having a shoulder 5 adjacent one end thereof. Each bore receives therein an actuator rod 6 which projects therethrough and is formed at its upper end with a head 7 having a segmental spiral gear 8 therein. The rod 6 is restrained from rotation by any suitable known means. A spring 9 surrounds rod 6 and is interposed between a collar 10 fitted to the lower portion of the rod and a collar 11 fitted in the upper end of bore 4. This spring tends normally to urge the rod 6 downwardly as viewed in Fig. 3.

The ring 2 is formed with a plurality of apertures 13 which are adapted to align with bores 4 in the base ring, and these apertures are adapted to receive the heads 7 of the actuator rods. Also formed in ring 2 are a plurality of bores 14 each adjacent to but spaced from an aperture 13. Each bore 14 receives therein a stationary chuck member 15, which is engaged with a shoulder 16 in said bore and keyed to the ring 2, and also a movable chuck member 17. The movable chuck member is provided with an arm 18 which seats within a recess 19 that connects bore 14 and aperture 13, and the end of this arm is formed with a segmental spiral gear 20 that is meshed with gear segment 8. The chuck members 15 and 17 are each provided with a bore 21 of prismatic cross section of any suitable size and shape to receive the article to be held.

In operation, a cam 22 is disposed beneath the actuator rod 6 at a suitable point, which serves to raise rod 6 against the tension of spring 9. Upward movement of rod 6 causes clutch member 17 to rotate by virtue of the spiral gear connection therewith, and thus align apertures 21 in the stationary and movable clutch members. An article to be held is now seated in apertures 21, whereupon rod 6 rides off cam 22 and spring 9 forces the rod downwardly, rotating clutch member 17, so that its aperture is out of alignment with the aperture in the stationary member 15. This serves to bind the article between the stationary and movable clutch members. After the desired operations have been performed on the article, the rod 6 is again engaged by the cam 22 to release the article in the clutch members.

In Figs. 7 to 10, inclusive, I have shown a modified clutch actuating mechanism wherein the movable clutch member 25 is formed with an arm 26, the outer end whereof is engaged by a spring 27 that is seated within a depression 28 in upper ring 2. This spring tends normally to rotate the clutch member 25 so that the article receiving aperture 21 therein is out of alignment with the aperture in the stationary clutch member 15, and thereby effects a binding action on an article as previously described. A cam rod 28 extends through aligning bores 29 in rings 1 and 2, and is disposed adjacent the arm 26. This rod is formed with a tapered portion 30 that is engaged with arm 26, as clearly shown in Fig. 9. The clutch is actuated by a cam engaging rod 28, as previously described. Upward movement of the rod as viewed in Fig. 9 will cause tapered portion 30 to move arm 26 and rotate clutch member 25, thereby aligning the apertures 21 and unlocking the article therein. As rod 28 descends, the clutch member 25 rotates in an opposite direction by spring 27 to lock the article in position on the support. The remaining elements of the structure are identical with those previously described.

While I have used the terms "upper" and "lower" in the specification with reference to the various parts, it will be understood that such terms are used to facilitate the description, and they are not intended to limit the position of the various parts nor the position in which the structure must operate.

I claim:

1. In a work support, a plurality of relatively rotatable members having axially aligned work receiving openings of non-circular cross section therein and spring operated means for relatively rotating said members to clamp the work inserted in said openings against rotation.

2. In a device of the class described relatively rotatable members having axially aligned work receiving openings of non-circular cross section therein, a rod carrying a spiral gear operatively connected to one member, a spring tending to move said rod in one direction and a gear carried by the other rotatable member meshing with the geared rod.

3. In a mechanism of the character set forth, a work support having a plurality of apertures therein, an element journaled in said support adjacent each aperture, and having an aperture in axial alignment with the aperture in said support, and common means for imparting relative movement to all of said elements to bind articles between the walls thereof.

4. In a mechanism of the character set forth, a work support having a plurality of apertures therein, an element journaled in said support adjacent each aperture, and having an aperture in axial alignment with the aperture in said support, means for imparting relative movement to said elements to bind an article between the walls thereof, and means for imparting a second relative movement to the elements to release the article.

5. In a mechanism of the character set forth, a work support having a plurality of apertures therein, an element journaled in said support adjacent each aperture, and having an aperture in axial alignment with the aperture in said support, and spring means for imparting relative movement to said elements to bind an article between the walls thereof.

6. In a mechanism of the character set forth, a work support having a plurality of apertures therein, an element journaled in said support adjacent each aperture, and having an aperture in axial alignment with the aperture in said support, spring means for imparting relative movement to said elements to bind an article between the walls thereof, and means for imparting a second relative movement to the elements to release the article.

7. In a mechanism of the character set forth, a work support having a plurality of apertures therein, an element journaled in said support adjacent each aperture, and having an aperture in axial alignment with the aperture in said support, spring means for imparting relative movement to said elements to bind an article between the walls thereof, and cam means for imparting a second relative movement to the elements to release the article.

In testimony whereof he hereunto affixes his signature.

JAMES W. HUGHES.